Aug. 17, 1965

S. E. VICKERS 3,200,425

HYDRAULIC TAPPER UNIT WITH MEANS TO PERMIT
YIELDING OF THE FEED NUT

Filed March 16, 1962

INVENTOR.
STANLEY E. VICKERS
BY
RICHEY, MCNENNY & FARRINGTON

ATTORNEYS

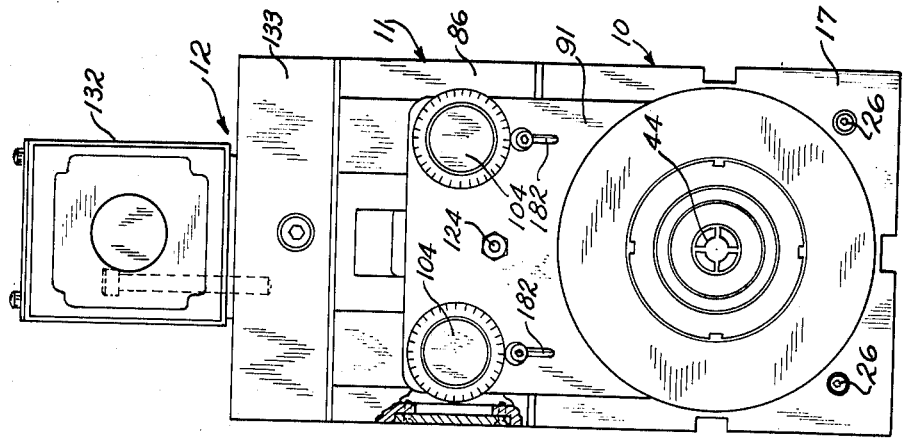
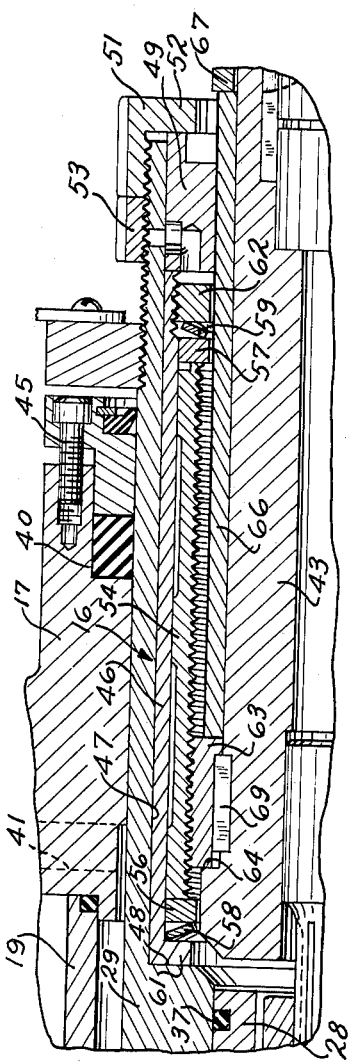
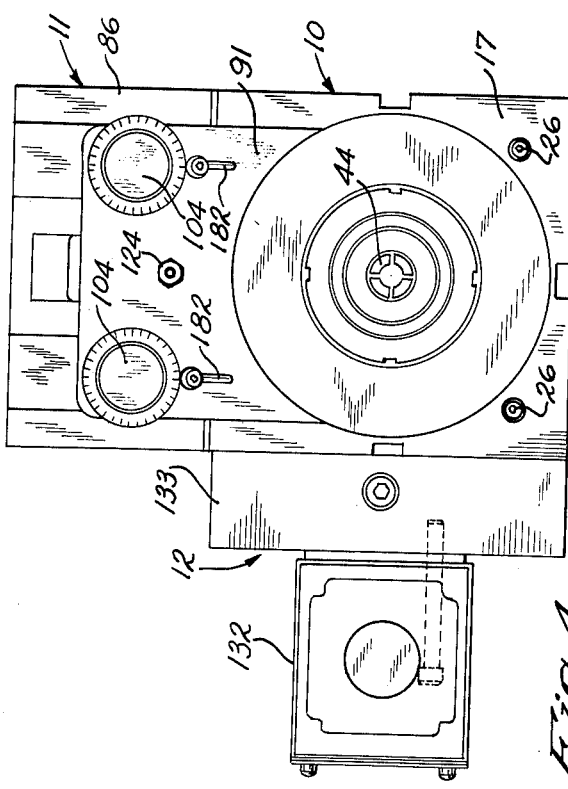

INVENTOR.
STANLEY E. VICKERS
BY
RICHEY, McNENNY & FARRINGTON
ATTORNEYS

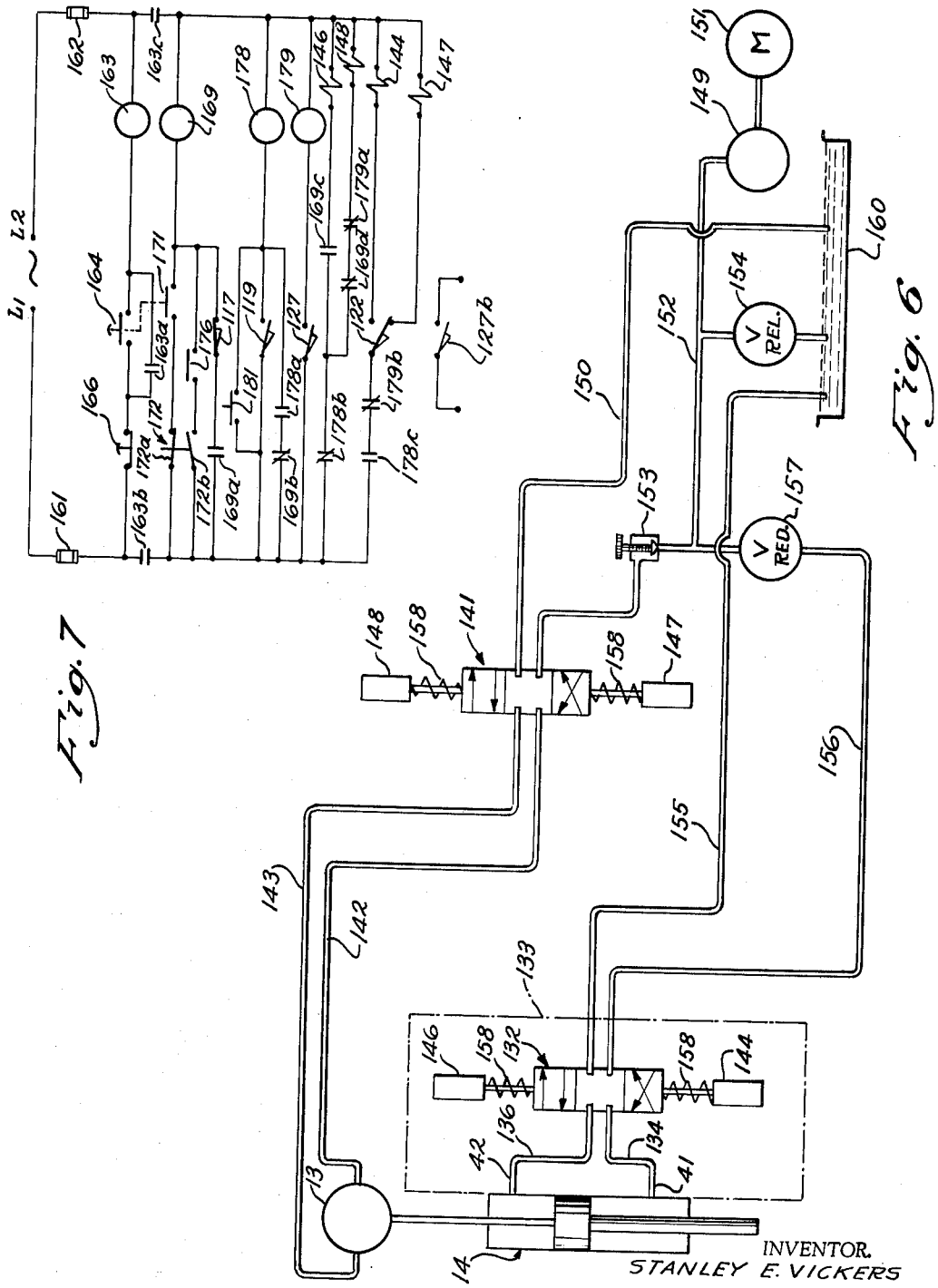

United States Patent Office 3,200,425
Patented Aug. 17, 1965

3,200,425
HYDRAULIC TAPPER UNIT WITH MEANS TO PERMIT YIELDING OF THE FEED NUT
Stanley E. Vickers, Columbus, Ohio, assignor, by mesne assignments, to Imperial Manufacturing Company, Middlefield, Ohio, a corporation of Ohio
Filed Mar. 16, 1962, Ser. No. 180,137
7 Claims. (Cl. 10—136)

This invention relates generally to power driven thread cutting devices and more particularly to a novel and improved hydraulically powered automatic tapping unit adapted for use in an automated system.

Automatic machining equipment is often constructed of a plurality of work units mounted to perform individual machining operations either simultaneously or sequentially on a workpiece which is automatically positioned before the unit. In many typical installations, workpieces are carried by an indexing table and are presented sequentially to a plurality of machining units each of which perform a necessary machining operation. Such automatic machines are usually custom manufactured and represent a considerable capital expenditure. For this reason, such specialized machinery is economically prohibited unless the production quantities of the part manufactured thereby is very high or unless the machine is constructed of individual elements which can be rearranged or readjusted to permit the manufacture of a number of different parts. An automatic tapping unit incorporating this invention is easily adjusted to change the stroke and operation of the unit so that it can be used in the manufacture of a variety of different parts with a minimum of set-up time.

In my copending application Serial No. 180,168 filed March 16, 1962, a drill unit is illustrated which can be assembled with the controls in a variety of positions or locations to make it possible to change the space envelope of the assembled unit. Such flexibility improves the utility of the unit by making it possible to use the unit in a variety of confined locations. A tapper incorporating this invention includes this same feature of assembly.

It is an important object of this invention to provide a novel and improved hydraulically powered tapping unit wherein the operational cycle can be varied easily to meet the particular requirements of a given machining operation.

It is another important object of this invention to provide a tapping unit having fast feeding and retraction of the tap to minimize the cycle time of a given operation in combination with a mechanical mechanism which controls the feed of the tap during the tapping and withdrawal of the tap.

It is another important object of this invention to provide a novel and improved tapping unit incorporating a mechanical feed wherein the mechanical feed may be easily changed to provide the correct lead for any particular tap and is protected against dirt, chips or other foreign matter.

It is another important object of this invention to provide a hydraulically powered tapping unit having positive mechanical drive means to feed the tap during the tapping operation wherein means are provided to prevent overloading of the tap or feed mechanism.

It is still another object of this invention to provide a novel and improved hydraulically powered tapping unit assembly which can be assembled in a variety of positions or arrangements to change the space envelope of the assembled unit and which is easily adjustable to change the stroke and cycle.

Further objects and advantages will appear from the following description and drawings wherein:

FIGURE 2 is an enlarged fragmentary view of the mechanical feed structure for feeding the tap mechanism during the tapping and withdrawal of the tap from the workpiece;

FIGURE 3 is an end view of the tapping unit illustrating one assembled arrangement of the assembly;

FIGURE 4 is a view similar to FIGURE 3 illustrating another assembled arrangement;

FIGURE 6 is a schematic illustration of the hydraulic circuit; and

FIGURE 7 is a schematic illustration of the electrical circuit.

Figure 1:
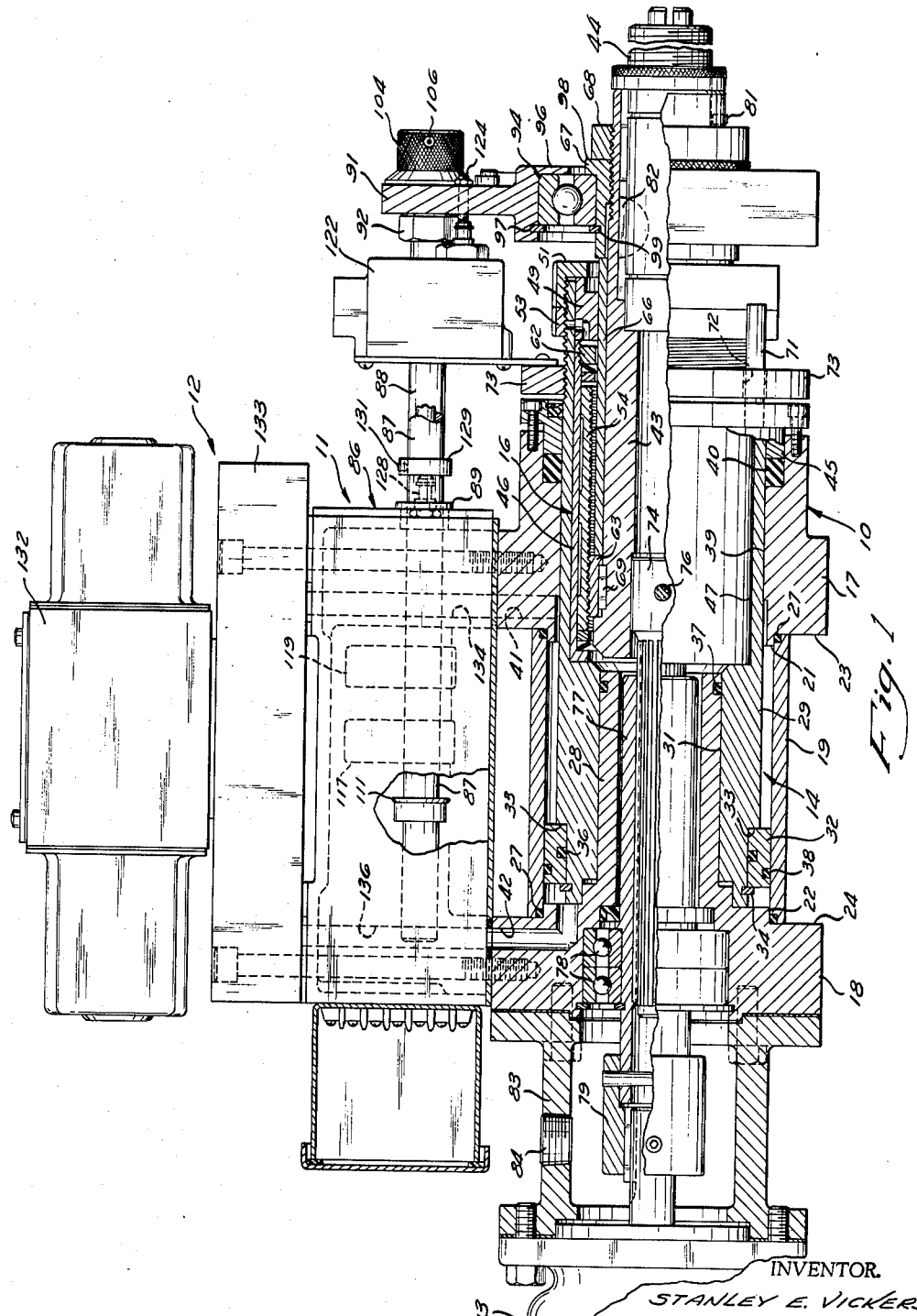
FIGURE 1 is a side elevation partially in longitudinal section illustrating the strucural details of the tapping unit incorporating this invention.

Referring to FIGURE 1, the preferred form of a tapper unit incorporating this invention includes three basic assemblies, a power assembly 10, an electrical control assembly 11 and a hydraulic control assembly 12. The power assembly 10 includes a reversible hydraulic motor 13 to rotate the tap, which may be of any suitable type such as a vane or gear type motor, and a piston type hydraulic actuator 14 which is operable to feed the tap to a position adjacent the workpiece during the forward stroke and retract the tap clear of the workpiece on the retraction stroke. A mechanical feed assembly 16 operates during the actual tapping operation to feed the tap forward in an amount equal to the lead of the thread being cut on each revolution of the tap. The mechanical feed also operates during the period when the tap is threaded back out of the workpiece after the thread is cut.

The electrical control assembly and the hydraulic control assembly 11 and 12, respectively, cooperate to control the motor 13 and actuator 14 to produce the required cycle of operation. This cycle is initiated when the actuator 14 is in the fully retracted position. During the first phase of the cycle, the motor 13 is shut off and the actuator 14 rapidly feeds the tap forward until it is adjacent to the workpiece. The actuator 14 is then hydraulically locked and the motor 13 is operated in the correct direction to rotate the tap for cutting the thread in the workpiece. During this phase of the operation, the mechanical feed assembly 16 operates to feed the tap forward into the workpiece until the tap reaches the desired end position. When this occurs, the motor 13 is reversed to thread the tap back out of the workpiece during which time the mechanical feed 16 continues to control the axial movement of the tap. As soon as the tap is clear of the workpiece, the motor 13 is shut off by the control mechanism and the actuator 14 is operated to fast feed the tap back to the fully retracted or initial position.

If the tapper unit is used in conjunction with an indexing table, the table is then operated to present a new workpiece and the cycle is automatically repeated. On the other hand, if the tap unit is used in connection with manual feeding, a new workpiece is inserted in the tooling and the tap unit is manually energized to repeat its cycle of operation.

The base of the power assembly 10 is formed of a forward end bell 17 and a rearward end bell 18 positioned on opposite ends of a cylinder member 19. The end bells 17 and 18 are formed with cylindrical shoulders 21 and 22, respectively, which fit into opposite ends of the cylinder member 19 and provide radial location therefor. The ends of the cylinder member 19 are clamped against radial walls 23 and 24 on the end bells by tie rods 26 illustrated in FIGURE 3. O-ring type seals 27 prevent leakage between the cylinder member 19 and the two end bells 17 and 18.

The end bell 18 is formed with an axially extending tubular collar 28 which extends concentrically along and spaced within the cylinder 19. A piston member 29 is formed with an inner bore 31 which engages with a sliding fit, the outer surface of the tubular collar 28. A piston head 32 is mounted on the piston 29 against a shoulder 33 by a snap ring 34. An O-ring seal 36 mounted on the piston head 32 prevents leakage between the piston 29 and the piston head 32. A dynamic seal 37 is mounted on the tubular collar 28 adjacent the forward end thereof and engages the bore 31 of the piston 29 providing a fluid seal therewith. A second dynamic seal 38 mounted on the piston head 32 engages the inner wall of the cylinder 19.

The forward end of the piston 29 extends through a bore 39 in the forward end bell 17 to provide a bearing laterally supporting the piston. A dynamic seal 40 is mounted in the forward end of the end bell 17 by a seal retainer 45 bolted to the end bell 17 to provide a fluid seal between the end bell 17 and the outer surface of the piston 29.

When fluid under pressure is applied to the left end of the piston 29, it reacts upon an effective area equal to the cross-sectional area between the tubular collar 28 and the inner wall of the cylinder member 19 and produces a force urging the piston 29 to the right. Conversely, when fluid under pressure is introduced to the right side of the piston head 32, it produces a force reaction on an effective area equal to the cross-sectional area between the bore 39 and the inner wall of the cylinder member 19 urging the piston to the left. Therefore, the effective area for extension or rightward movement of the piston 29 is substantially greater than the effective area for retraction or leftward movement.

The forward end bell 17 is formed with a radial port 41 through which liquid is admitted or exhausted from the right side of the piston head 32 and the rearward end bell 18 is formed with a port 42 through which liquid is admitted to or exhausted on the left end of the piston 29.

The piston 29 serves as a carrier for the mechanical feed assembly 16 and in turn, a spindle 43 in which a tap chuck 44 is mounted.

Reference should now be made to FIGURE 2 which is an enlarged fragmentary view of the feed mechanism. A cartridge body 46 is mounted within a bore 47 in the forward end of the piston 29 and is seated against a radial shoulder 48 by a bearing spacer 49. The bearing spacer 49 is in turn mounted in the piston 29 by a retainer nut 51 formed with a shoulder 52 engaging the bearing and spacer 49. The retainer 51 is threaded onto the end of the piston 29 and is locked in place by a lock nut 53.

Mounted within the cartridge body 46 is an internally threaded lead nut 54 seated at its left end against a first clutch disc 56 and at its right end against a second clutch disc 57. The two clutch discs 56 and 57 are axially pressed toward the associated ends of the lead nut 54 by Belleville type spring washers 58 and 59 respectively. The spring washer 58 is seated against a shoulder 61 on the inner end of the cartridge body 46 and the spring washer 59 is seated against a retainer ring 62 threaded into the right end of the cartridge body 46. In this manner the lead nut 54 is normally fixed relative to the cartridge body 46 but excessive loads thereon will cause the lead nut to shift axially against the action of the springs 58 or 59 or rotate relative to the cartridge body against the friction of the clutch disc 56 and 57. This mounting therefore prevents excessive strain from being applied to the assembly in the event that the tap fails to start cutting the thread immediately upon contact wih the workpiece.

A lead screw 63 is threaded into the lead nut 54 and is axially mounted on the spindle 43 against a shoulder 64 by a spacer tube 66 which surrounds the spindle 43 and engages along its outer surface the bearing and spacer ring 49. In order to lock the spacer tube 66 against the lead screw 63, an internally threaded ring 67 is threaded onto the outer end of the spindle 43 and is locked in place by a lock ring or lock nut 68 (illustrated in FIGURE 1). A key 69 locks the lead screw 63 against rotation relative to the spindle 43 so when the spindle 43 rotates relative to the lead nut 54, the lead screw is threaded along the lead nut causing the spindle to move forward or backward depending upon the direction of rotation of the spindle. In order to prevent rotation of the piston 29, one or more dowel pins 71 (illustrated in FIGURE 1) are mounted on the spacer ring 49 and project through bores 72 formed in a collar 73 threaded onto the piston 29 and locked against rotation by a key (not shown).

Rotation is imparted to the spindle 43 by the hydraulic motor 13 through a splined quill 74 mounted at its right end in the spindle 43 by a tapered pin 76. The left end of the quill 74 fits into a female spline formed in a hollow drive shaft 77. The drive shaft 77 is journaled in the left end bell 18 within anti-friction bearings 78 and is connected to the hydraulic motor 13 by a coupler 79. By driving the spindle 43 through a splined quill, it is possible to drive the spindle while the spindle is moved axially relative to the frame and hydraulic motor 13. A spacer housing 83 is bolted onto the rearward end of the end bell 18 and provides support for the hydraulic motor 13. A plug 84 may be removed to provide access to the coupling 79 for service thereof. The chuck 44 is mounted in the forward end of the spindle 43 by a suitable set screw 81 and is locked against rotation by a key 82.

When pressurized liquid is supplied to the left end of the piston 29 through the port 42, the piston is extended carrying the chuck 44 and the tap mounted therein to the right. The mechanical feed assembly 16 including the lead nut 54 and the lead screw 63 is thus carried by the piston 29 from the retracted position illustrated in FIGURE 1 forward to a position adjacent the workpiece in a rapid manner so that the cyclic time of operation can be reduced to a minimum. Conversely, after the tap is threaded out of the workpiece, the piston 29 carries the assembly back to the retracted position under the influence of pressure supplied to the port 41. During the tapping operation, the piston 29 remains stationary relative to the end bells 17 and 18. Normally, a hydraulic lock is provided by closing both of the ports 41 and 42. However, in some instances it may not be necessary to provide hydraulic locking since the various seals provide sufficient friction resisting movement of the piston 29.

During the tapping operation, the hydraulic motor 13 drives the spindle 43 in the required direction to cause the tap to cut the thread in the workpiece. The interengagement between the lead screw 63 and the nut 54 causes the spindle 43 to be fed forward at the proper rate. The lead of the threads of the lead screw 63 and the lead nut 54 have the same lead as the tap which is cutting the thread. By providing mechanical feed for the tapping operation, a superior thread is cut since the tap does not have to lead itself into the workpiece and the only load on the tap is the thread cutting load. In the event that the tap slips slightly before it commences to cut into the workpiece, the spring mounting of the lead nut 54 prevents excessive loads from occurring by either allowing the lead nut 54 to move slightly in an axial direction along the cartridge body 46 or by permitting rotation of the lead nut 54 with the lead screw 63 until proper tapping is commenced. This mounting thereby limits the load applied to the cap and minimizes wear or breakage thereof.

The electrical control assembly 11 senses the position of the spindle relative to the housing and also the relative position between the spindle 42 and the piston 29.

The electrical control assembly functions to shift the control valve of a hydraulic system at predetermined points in a cycle and thereby control the cyclic operation of the unit. Means are provided for easily and accurately adjusting the electrical control assembly so that the cycle of operation can be modified to meet the requirements of any particular operation.

Figure 5:
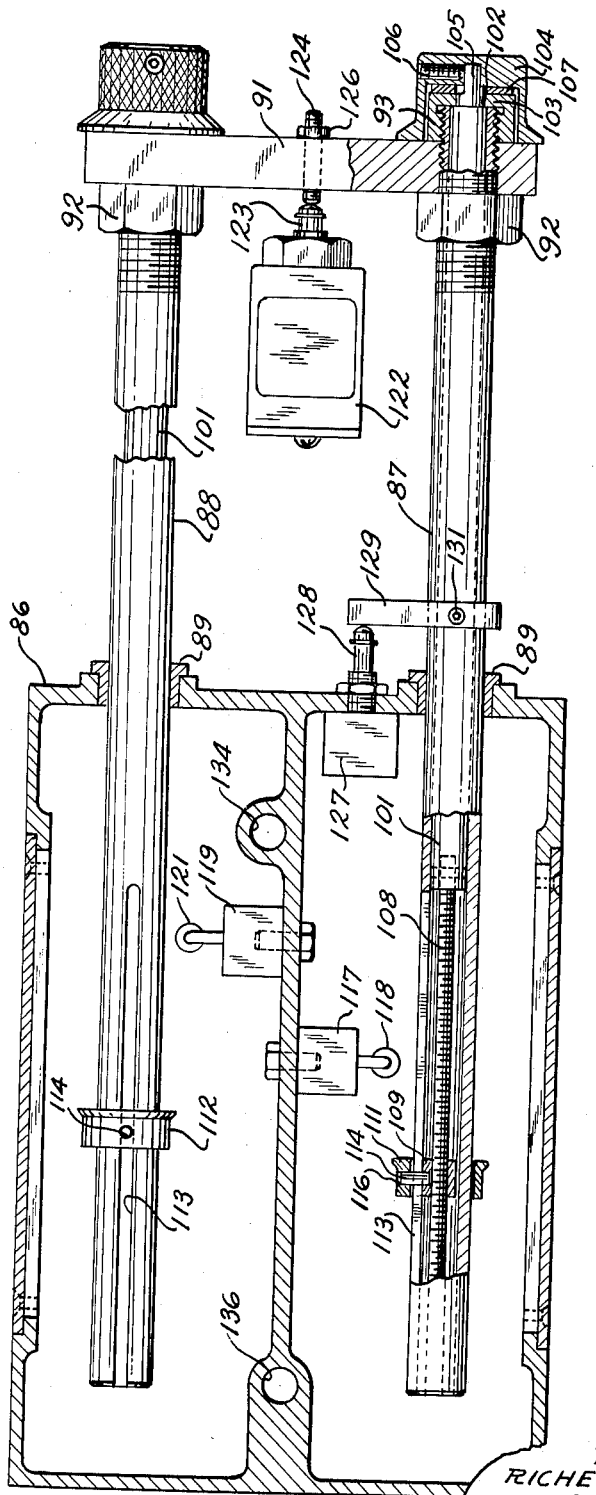
FIGURE 5 is a plan view partially in section of the control mechanism which controls the stroke operation.

Referring to FIGURES 1 and 5, the electrical control assembly consists of a control housing 86 bolted to the two end bells 17 and 18. A pair of control rods 87 and 88 extend through bushings 89 mounted in the control housing and are supported at their forward end on a control arm 91. Each of the control rods 87 and 88 is provided with a lock nut 92 engaging one side of the control arm 91 and a lock nut 93 engaging the opposite side so that the outer end of each of the control rods is firmly anchored on the control arm 91. The control arm 91 is supported on the outer race of an anti-friction bearing 94 by a flange 96 and snap ring 97. The inner race of the bearing 94 is mounted on the ring 67 between a shoulder 98 and a snap ring 99 so the control arm 91 is carried through the connection of the bearing 94 axially with the spindle 43. The control arm 91 does not rotate when the spindle rotates due to the restraining action of the control rods 87. By virtue of this connection, the control rods 87 and 88 move axially with the spindle 43 so that the position of the control rods is directly related to the position of the spindle.

Each of the control rods 87 and 88 is tubular to receive a control shaft 101. Only the mounting and operation of the shaft 101 associated with the control rod 87 is illustrated in section but the structure of the shaft 101 associated with the control rod 88 is identical and the following detailed description applies equally thereto. The control shaft 101 is formed with a shoulder 102 engaging a radial flange 103 on the lock nut 93. An adjustment knob 104 is mounted on a shank 105 on the control shaft 101 by a set screw 106 and cooperates with the shoulder 102 and flange 103 to fix the control shaft 101 within the control rod associated therewith against axial movement. A thrust washer 107 is interposed between the control knob 104 and the flange 103. The shank 105 of the control shaft 101 is formed with a flat engaged by the set screw 106 so that rotation of the control knob 104 produces rotation of the control shaft 101.

The inner end of each of the control shafts 101 is connected to a screw 108 along which a cam nut 109 is moved by rotation of the shaft 101 and screw 108. A cam 111 encircles the control rod 87 with a sliding fit and a similar cam 112 is positioned around the control rod 88. Each of the control rods 87 and 88 is formed with an axially extending slot 113. A pin 114 is mounted in the associated cam nut 109 with a press fit and extends through the slot 113 into a sliding fit bore 116 in the associated cams 111 and 112. The pin 114 serves to axially locate the cams 111 and 112 relative to their associated cam nut 109 and prevent rotation of the nuts 109 by virtue of the engagement with the walls of the slot 113. This structure permits accurate and easy adjustment of the cams 111 and 112 relative to the control rods 87 and 88 respectively. When it is desired to change the position of either of the cams, the associated control knob 104 is turned in the desired direction to cause the cam nut 109 to be threaded along the control shaft 101 to the desired position. This provides external adjustment which is used to change the stroke limits of the unit which will be described below.

A first limit switch 117 is mounted within the control housing 87 and is provided with an operator arm 118 engaged by the cam 111 as the control rod 87 moves toward the extended position. A second limit switch 119 is provided with an operating arm 121 for engagement by the cam 112. Preferably, the limit switches 117 and 119 are of the micro-switch type. A third limit switch 122 is mounted on the collar 73 for movement with the piston 29 and is provided with an operator 123 positioned for engagement by an adjustable screw 124 threaded through the control arm 91. A locked nut 126 is mounted on the screw 124 to lock it in the adjusted position. A fourth limit switch 127 is mounted in the control housing 86 and is provided with an operator 128 positioned for engagement by a cam 129 mounted on the control rod 87. A set screw 131 is used to lock the cam 129 in its adjusted position on the control rod 87.

Referring to FIGURE 6, two solenoid operated four-way valves are used to control the hydraulic flow to the unit. The first soleniod valve 132 is mounted on a manifold plate 133 which in turn, is mounted directly on the unit. In some installations the manifold plate 133 is mounted on the side of the housing 86 remote from the end bells 17 and 18 as illustrated in FIGURES 1 and 3. The control housing 86 is formed with a through passage 134 which is located in registry with the port 41 in the forward end bell 17 when the control housing 86 is mounted in the positions of FIGURES 1 and 3. Similarly, a second through bore 136 communicates with the port 42 in the rearward end bell 18. The manifold plate 133 is formed with passageways connecting the valve 132 to the through bores 134 and 136 so that the control valve 132 is connected to the ports 41 and 42.

The piston and cylinder hydraulic actuator 14 is controlled by the control valve 132 mounted on the manifold 133 while the hydraulic motor 13 is controlled by a control valve 141 mounted separate from the unit. Both of the control valves 132 and 141 are three position four-way valves having an off mid-position. The controlled ports of the valve 132 are connected to the ports 41 and 42 to control the actuator 14 and pressure lines 142 and 143 connect the control valve 141 with the hydraulic motor 13. When the two valves 132 and 141 are in the neutral position illustrated, both of the hydraulic drives are shut off.

The control valve 132 is provided with two electric solenoids 144 and 146 which are selectively energized to shift the control valve to one or the other of the operated positions. Similarly, the control valve 141 is provided with two solenoids 147 and 148 which are selectively energized to operate the control valve 141. Fluid under pressure is applied from a pump 149 driven by any suitable power source such as an electric motor 151. The pressure output of the pump 149 is connected by a pressure line 152 to the control valve 141 through an adjustable flow control valve 153 which is adjusted to control the speed of the tapping drive motor 13 and a reservoir return 150 connects the valve 141 to the reservoir 160. The control valve 153 may be of any suitable type and may be provided with temperature and pressure compensation when extremely accurate control is desired. A relief valve 154 is connected to the pressure line 152 to prevent over pressurizing of the system. A pressure line 156 connects the control valve 132 to the pressure line 152 through a pressure reducing valve 157 and a line 155 connects to the reservoir 160. Normally, the hydraulic motor 13 is operated at a presusre in the order of 2,000 p.s.i. and the hydraulic actuator 14 is operated in the order of pressure at 300 p.s.i. The use of high pressure to operate the motor 13 permits the use of a relatively small motor 13 while still providing sufficient power for operation. The actuator 14, however, does not operate during the working portion of the stroke and is not subjected to heavy loads so the pressure for the actuator 14 can be substantially lower. The use of low pressure also has the advantage of producing more accurate control. If desired, a low pressure pump can be substituted in the hydraulic system to power the actuator 14 and a separate high pressure pump used to power the motor 13. This would result in a savings of energy since the energy loss occurring in the pressure reducing valve would be eliminated.

Each of the control valves 132 and 141 is spring biased by suitable springs 158 to the neutral position when the solenoids are not energized. During a normal cycle of operation, the soleniod 146 is first energized to shift a valve 132 toward the upward position connecting the pressure line 156 to the port 42 to cause extension of the actuator. When a predetermined point is reached, the solenoid 146 is deenergized permitting the valve 132 to return to the off position, thus hydraulically locking the actuator 14. The solenoid 148 is simultaneously energized to shift the valve 141 upwardly to operate the tapping motor 13. When the tapping operation is completed, the solenoid 148 is de-energized and the solenoid 147 is energized to shift the valve and reverse the motor 13. This withdraws the tap from the workpiece. After the tap is clear of the workpiece the solenoid 147 is de-energized allowing the valve 141 to return to the off position. At this time the solenoid 144 shifts the control valve 132 to retract the actuator 14 to its initial position.

Reference should now be made to FIGURE 7 for a detailed discussion of the electric control system. Line voltage of the control circuit is applied at $L_1$ and $L_2$ through the fuses 161 and 162. A power relay 163 is connected across the line through a normally open start switch 164 and a series connected normally closed stop switch 166. A normally open interlock 163a on the power relay 163 is connected in parallel with the start switch 164 to provide a holding circuit for the power relay. The power relay is also provided with normally open interlocks 163b and 163c, one of which is in each of the supply lines $L_1$ and $L_2$. These interlocks isolate the remaining portions of the control circuit from the power source when the control relay or power relay 163 is de-energized.

A first control relay 169 is connected across the line below the interlocks 163b and 163c through a normally open contact 171 on the start switch 164 which is connected in series with a manually operated selector switch 172. The selector switch 172 is provided with a first contact 172a in series with the contact 171 which is closed when the unit is to be manually operated and a second contact 172b which is closed when the unit is to be automatically operated. The switch 172 is arranged so that one or the other of the contacts 172a or 172b is closed in each position of the switch. Connected in series with the contact 172b is a normally open switch 176 mounted on the associated workpiece feed device. This switch 176 is momentarily closed to initiate a cycle of operation of the tapping unit. As an example, the switch 176 is mounted on the indexing table to initiate operation of the tapping unit when a new workpiece is presented in position for tapping. When the switch 172 is moved to the automatic position, the contact 172b is closed and the switch 176 is connected in series with the coil of the relay 169 and operates to energize the relay 169 whenever the switch 176 is closed. A normally open interlock 169a on the relay 169 and the limit switch 117 are connected in series with each other and in parallel with the starting contact 171 and switch 176 to provide a holding circuit for the relay 169.

A second control relay 178 is connected across the line through a normally open contact on the limit switch 119. A normally open interlock 178a on the second control relay 178 is connected in series with a normally closed interlock 169b and in parallel with the limit switch 119 to provide a holding circuit for the relay 178.

A third control relay 179 is connected across the line in series with a normally open contact on the limit switch 127.

The solenoid 146 is connected across the line in series with a normally open interlock 169c on the control relay 169 and a normally closed interlock 178b on the control relay 178. The solenoid 148 is connected in series with the normally closed interlock 178b, a normally closed interlock 169d on the relay 169 and a normally closed interlock 179a on the relay 179. The solenoid 144 is connected across the line through series connected normally opened contacts on the limit switch 122, a normally closed interlock 179b on the relay 179 and a normally open interlock 178c on the relay 178. The limit switch 122 normally connects the solenoid 147 in series with the interlock 178c and 179b but is operated when the operator 123 engages the screw 124 to open the circuit to the solenoid 147 and close the circuit to the solenoid 144.

The limit switch 127 is preferably provided with a separate normally open contact on 127b which may be connected to the indexing table or other workpiece feeding device to energize such device after the tapper unit has completed its cycle.

Assuming that the selector switch 172 is set for manual operation, the operation of the control system is as follows. When the start switch 164 is closed, the power relay 163 is energized closing the interlocks 163b and 163c supplying power to the remaining circuit. The interlock 163a closes to provide a holding circuit for the power relay 163 maintaining it energized. The contact 171 is also closed when the start switch 164 is operated to energize the first control relay 169. This causes the interlock 169a to close providing a holding circuit for the first control relay 169. When the first control relay 169 is energized, the interlock 169c closes and energizes the solenoid 146. At the same time, the interlock 169d opens to prevent the solenoid 148 from being energized. The solenoid 146 operates to shift the control valve 132 to cause the actuator 14 to extend moving the tap forward in a fast feed operation. This continues until the limit switch 117 is operated by the cam 111 to open the holding circuit for the relay 169. When the unit is in the fully retracted or initial position, the limit switch 127 is in engagement by the cam 129 so that the contact 127a is closed. Therefore, the control relay 179 is also energized when the operation is initiated. However, as soon as the actuator 14 begins to extend, the contact 127a is opened to drop out the relay 179. Since the relay 179 is energized at the beginning of the cycle, the interlock 179a is open when the switch 171 is closed and prevents chattering of the solenoid 148.

When the limit switch is operated to drop out the relay 169, all three of the control relays 169, 178 and 179 are de-energized. At this time the interlock 169d closes and causes the solenoid 148 to be energized. When the solenoid 148 is energized, it shifts the control valve 141 to operate the hydraulic motor 13 to commence the tapping operation. The tapping operation continues until the limit switch 119 is operated by the cam 112 which energizes the control relay 178. When the control relay 178 picks up, it closes the interlock 178a providing a holding circuit parallel with the limit switch 119. At the same time, the interlock 178b is opened, thus de-energizing the solenoid 148. Picking up of the control relay 178 also closes the interlock 178c. When the tap is in the extended position, the limit switch 122 is in the position illustrated in the electrical diagram so the solenoid 147 is energized to cause the control valve 141 to shift and reverse the motor 13 to withdraw the tap. As soon as the limit switch 122 is operated by engagement of its operator 123 with the screw 124, it shifts to de-energize the solenoid 147 and energize the solenoid 144. This allows the control valve 141 to return to its off position stopping the motor 13 and at the same time results in shifting of the control valve 132 to the retracted position. This causes rapid retraction until the limit switch 127 is engaged by the cam 131 causing the contact 127 to close. This energizes the relay 179 opening the interlock 179b de-energizing the solenoid 147. Thus, the unit remains in the fully retracted position until the start switch button is again operated to close the contact 171 and repeat the cycle. When the unit is to be operated automatically, the selector switch 172 is moved to close the contact 172b. The cycle is then repeated each time the external switch 176 is closed by the automatic feed system of the associated equipment. A reset switch 181 is connected in parallel with the limit switch 119 to permit manual operation of the unit to retracted position.

The limit switch 122 carried by the piston 29 assures that the spindle will move back to the same position relative to the piston during each cycle of operation. This assures repeatability of the cycle which is essential to proper operation. The remaining limit switches sense the relative position of the spindle 43 and the unit body. Therefore, the unit will cut a thread to a predetermined point accurately on each cycle of operation and return to the fully retracted position each time the machine is cycled.

Camming lock arms 182 may be mounted on the end plate to lock the adjustment knobs 104 in their adjusted position. By providing two control rods 87 and 88 with separate adjustment of the associated cams 111 and 112, it is possible to independently adjust the approach portion of the stroke and the total stroke. Since the unit should return to its fully retracted position at the end of each cycle, it is normally not necessary to adjust the cam 129 or the screw 124 after the initial adjustment of the unit.

When the space available for mounting the tapper unit prevents an assembly as illustrated in FIGURES 1 and 3, it is possible to mount the control housing 86 on any of the other three sides of the end bells 17 and 18. The manifold plate 133 is then mounted directly on the end bells 17 and 18 as illustrated in FIGURE 4. To permit this flexibility of assembly, the end bells 17 and 18 are formed with a square section so that the control housing 86 can be mounted on any one of the four faces of the square section and it will be positioned the same distance from the center line of the spindle 43. The manifold plate 133, however, should always be mounted adjacent to the same face so that the ports in the manifold plate will always communicate with the ports 41 and 42 of the end bells 17 and 18.

When the unit is assembled as illustrated in FIGURES 1 and 3, the fluid communication is provided through the control housing bores 134 and 136. However, when the unit is assembled as illustrated in FIGURE 4, the manifold plate 133 is mounted directly upon the end bells 17 and 18 and the ports therein communicate directly with the ports 41 and 42.

To change the assembled envelope of the unit it is merely necessary to remove the bolt fastening the manifold plate 133 and control housing 86 and rotate the collar 73 to the desired position for reassembly. The collars 73 are provided with suitable bores 72 to permit its assembly in any one of the four possible positions. The control arm 91 of course is journaled on the bearings 94 so it is easily rotatable to the new position. The control housing 86 and the manifold plate 133 can then be re-bolted in the required assembled position. The end bells 17 and 18 should be provided with tap holes on each of their faces to permit the control housing to be mounted on each of such faces. Each of the three faces of the end bells 17 and 18 is formed with an axially extending keyway 139 which assists in locating the unit on the mounting plate of the associated machine. The same tap hole used to mount the control housing 86 cooperates with a key in the keyway and receive the mounting bolts for the unit. Such bolts normally extend through the mounting plate (not shown) and are threaded into the tap holes.

Referring again to FIGURE 1, when it is required to change the tap to a different lead, it is necessary to remove and replace the mechanical feed with a unit having a lead the same as the new tap. The replacement of the mechanical feed is accomplished by removing the control arm 91. Thereafter the retaining nut 51 is loosened to permit removal of the entire spindle assembly including the cartridge body 46. It is generally desirable to have a full spindle assembly and lead screw cartridge assembly for each tap lead required. However, if this is not satisfactory, the retainer 62 can be removed to permit removal of the lead nut 54 and lead screw 63. The assembly may be reassembled with a new lead nut and lead screw having the proper lead and the unit is then reassembled.

Although a preferred embodiment of this invention is illustrated, it is to be understood that various modifications and rearrangements of parts may be resorted to without departing from the scope of the invention as defined in the following claims.

What is claimed is:

1. A tapper unit comprising a base, a carrier element linearly reciprocable on said base, a tap spindle element supported by said carrier element rotatable relative to said carrier element and movable relative thereto along the axis of rotation thereof, lead screw and nut members, one of said members being mounted on said carrier element fixed against substantial axial movement relative thereto and rotatable in response to axial thrust on said spindle greater than a predetermined value and the other of said members being mounted on said spindle element, said members interengaging to axially move said spindle relative to said carrier in response to relative rotation therebetween, rotary means connected to rotate said spindle, actuator means connected to move said carrier, a first control connected to said rotary means and actuator means operating said actuator means to move said spindle element to a first predetermined position relative to said base and energize said rotary means, a second control operable to reverse said rotary means when said spindle reaches a second predetermined position relative to said base, and a third control operable to stop said rotary means when said spindle reaches a third predetermined position relative to said carrier and operate said actuator means to move said carrier relative to said base.

2. A tapper unit comprising a base, a carrier element linearly reciprocable on said base, a tap spindle element supported by said carrier element rotatable relative to said carrier element and movable relative thereto along the axis of rotation thereof, lead screw and nut members, one of said members being mounted on said carrier element and the other of said members being mounted on said spindle element, at least one of said mountings of said members normally fixed in said members to its associated element against unlimited relative rotation relative thereto and permitting movement between such member and its associated element when the force thereon exceeds a predetermined maximum, said members interengaging to axially move said spindle relative to said carrier in response to relative rotation therebetween, rotary means connected to rotate said spindle, an actuator means connected to move said carrier and operable to lock said carrier relative to said base, a first control connected to said rotary means and actuator means operating said actuator to move said spindle element to a first predetermined position relative to said base and energize said rotary means, a second control operable to reverse said rotary means when said spindle reaches a second predetermined position relative to said base, and a third control operable to stop said rotary means when said spindle reaches a third predetermined position relative to said carrier and operate said actuator means to move said carrier relative to said base.

3. A tapper unit comprising a base, a support linearly reciprocable on said base, a tap spindle supported by said support rotatable relative to said support and movable relative thereto along the axis of rotation thereof, a lead screw and nut, said nut being mounted on said support, said screw being mounted on said spindle, the mounting of said nut on said support normally preventing movement therebetween and permitting unlimited relative rotation therebetween when the force thereon exceeds a predetermined maximum, said screw and nut interengaging to axially move said spindle relative to said support in response to relative rotation therebetween, rotary means connected to rotate said spindle, actuator means connected to move said support and operable to lock said support relative to said base, a first control connected to said rotary means and actuator means operable to lock said actuator means when said spindle reaches a first predetermined position relative to said base and energize said rotary means, a second control operable to reverse said rotary means when said spindle reaches a second predetermined position relative to said base, and a third control operable to stop said rotary means when said spindle reaches a third predetermined position relative to said carrier and operate said actuator means to move said carrier relative to said base.

4. A drive unit for cutting tools comprising a base, a support assembly reciprocable on said base from a retracted position, a tool spindle assembly carried by said support assembly for rotation relative thereto, piston and cylinder means connected between said support assembly and base operable in response to liquid under pressure to control the position and reciprocation of said support assembly relative to said base, a pair of interengaging threaded elements with one mounted on said support assembly and the other mounted on said spindle assembly operable in response to rotation of said spindle assembly to move said spindle assembly axially with respect to said support, the mounting of one of said threaded elements on its associated assembly permitting limited axial movement and unlimited rotation thereof with respect to said associated assembly in response to excessive axial thrust on said spindle assembly, a reversible rotary motor on said base connected to rotate said spindle assembly, and control means connecting said source, piston and cylinder means, and said rotary motor automatically operable through a cycle including a first step in which pressure is supplied to cause said piston and cylinder means to move said spindle assembly to a first predetermined position with respect to said base and then hydraulically lock said support assembly in the position it is in when said spindle assembly is in said first predetermined position, thereafter operate said rotary motor to move said spindle assembly with respect to said support assembly until said spindle assembly reaches a second predetermined position with respect to said base, and thereafter reverse said rotary motor and operate it in such reverse direction until said spindle assembly moves to a predetermined location relative to said support assembly, and thereafter while said rotary motor is non-operative to supply pressure to move said spindle assembly to its initial position.

5. A drive unit for cutting tools comprising a support assembly, a spindle assembly reciprocable and rotatable relative to said carrier assembly, screw and nut members interconnected to produce relative axial movement therebetween in response to relative rotation, a first mounting securing one of said members against movement relative to one of said assemblies, a second mounting normally preventing movement between the other of said members and the other of said assemblies and including clutch means operable to permit unlimited relative rotation between said other member and said other assembly in response to axial thrust on said spindle assembly beyond a predetermined value, motor means connected to rotate said spindle assembly and produce relative axial movement between said assemblies only when said clutch means prevents relative rotation between said other member and said other assembly, and control means connected to said motor means operable to produce rotation of said spindle assembly until said spindle assembly reaches a first predetermined extended position and then reverse said motor means and rotate said spindle assembly in the opposite direction until said spindle assembly retracts to a predetermined position relative to said support assembly, said control means automatically compensating for any slippage of said clutch means.

6. A drive unit for cutting tools comprising a base, a support assembly reciprocable on said base, a spindle assembly reciprocable and rotatable relative to said support assembly, first motor means operable to reciprocate said support assembly between a retracted position and an extended position, screw and nut members connected to produce relative axial movement therebetween in response to relative rotation, a first mounting securing one of said members against movement relative to one of said assemblies, second mounting means normally preventing movement between the other of said members and the other of said assemblies and including clutch means operable to permit unlimited relative rotation between said other member and said other assembly upon axial thrust on said spindle assembly beyond a predetermined value, reversible motor means operable to rotate said spindle assembly, and control means operable to energize said second motor means when said support assembly reaches said extended position for rotation of said spindle assembly until said spindle assembly reaches a first predetermined position, reverse said second motor means and rotate said spindle assembly in the opposite direction when said spindle assembly reaches said first predetermined position, and thereafter stop said second motor means only after said spindle assembly retracts to a second predetermined position relative to said support assembly, said control means automatically compensating for slippage of said clutch means.

7. A drive unit according to claim 6 wherein said clutch means also permits limited relative axial movement between said other element and said other assembly.

References Cited by the Examiner
UNITED STATES PATENTS

| | | | |
|---|---|---|---|
| 688,182 | 12/01 | Koontz | 74—424.8 |
| 721,896 | 3/03 | Koontz | 74—424.8 |
| 1,746,266 | 2/30 | Klausmeyer | 10—139 |
| 1,747,111 | 2/30 | Galloway | 10—130 |
| 2,165,396 | 7/39 | Mansfield | 10—135 |
| 2,181,873 | 12/39 | Cregar | 10—139 |
| 2,310,124 | 2/43 | Shartle | 10—136.5 |
| 2,500,540 | 3/50 | Graves | 10—139 |
| 2,587,352 | 2/52 | Manning | 10—139 |
| 2,770,821 | 11/56 | Adlaf | 10—135 |
| 2,830,310 | 4/58 | Smith | 10—136.5 |
| 2,958,232 | 11/60 | Benninghoff et al. | 10—139 |

ANDREW R. JUHASZ, *Primary Examiner.*